Dec. 25, 1923.
S. SACERDOTE ET AL
1,478,919
THERMOELECTRIC HEAT ACCUMULATING COOKING STOVE
Filed March 24, 1921    5 Sheets-Sheet 1
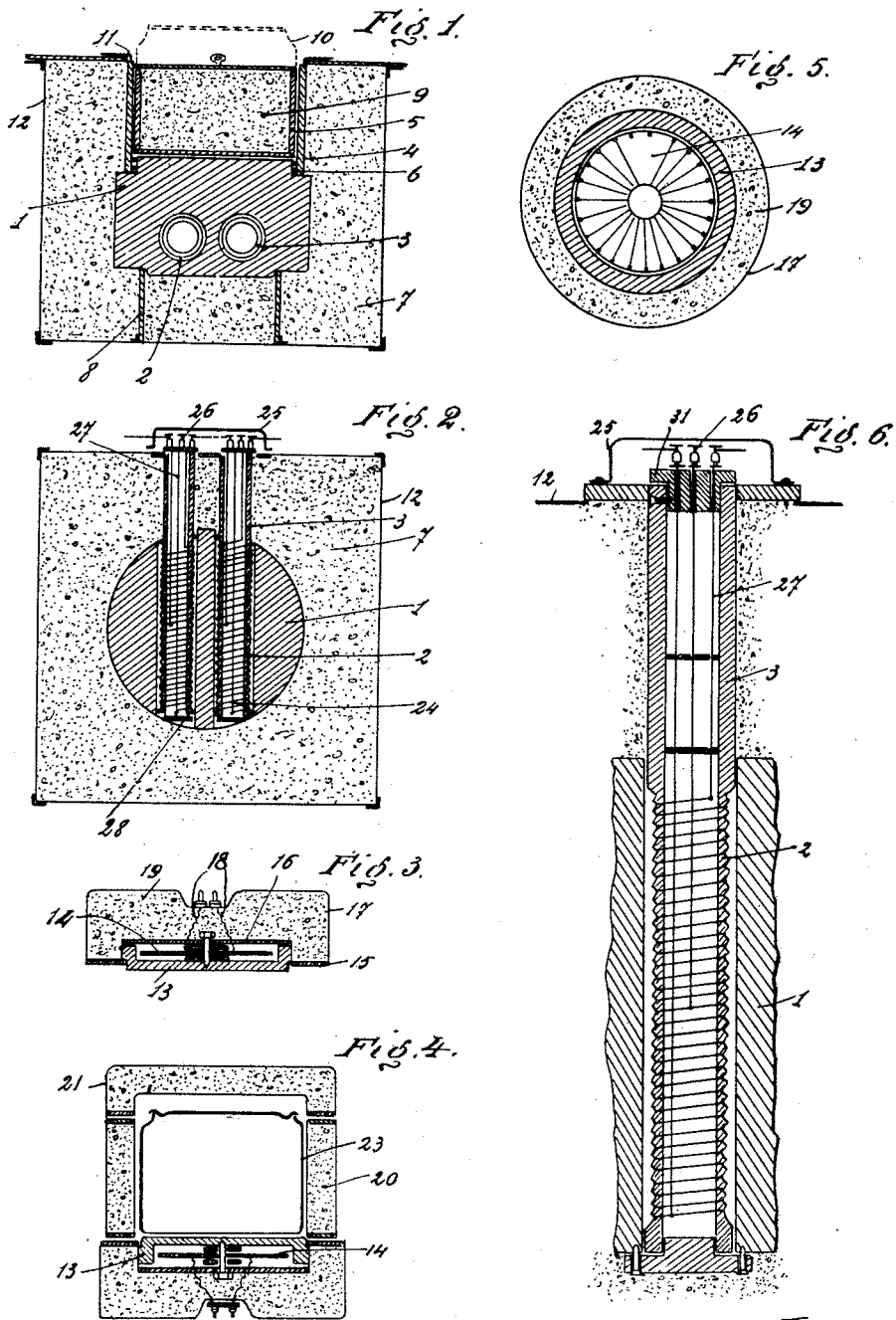
Inventors:
Secondo Sacerdote
and Severino Cristiani
By
Attorney Dec. 25, 1923.
S. SACERDOTE ET AL
1,478,919
THERMOELECTRIC HEAT ACCUMULATING COOKING STOVE
Filed March 24, 1921    5 Sheets-Sheet 2
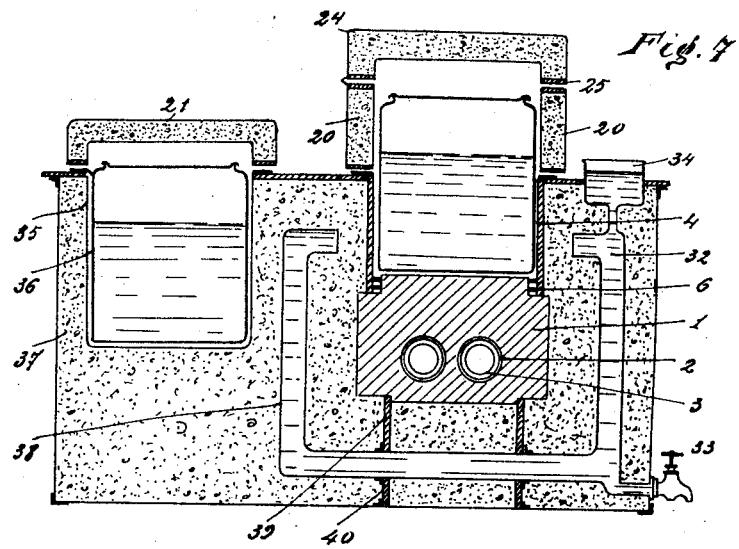
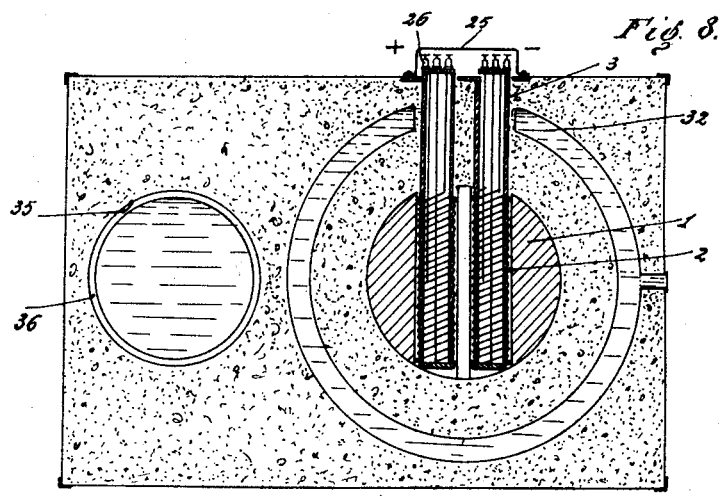
Inventors:
Secondo Sacerdote
and Severino Cristiani
By Luis [Squire] he
Attorney

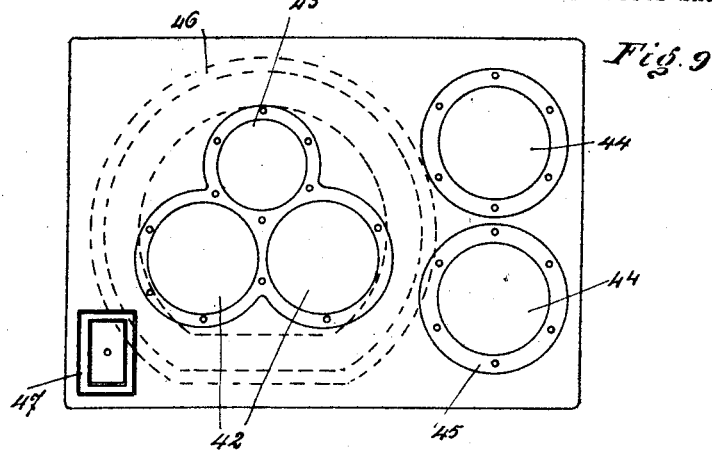
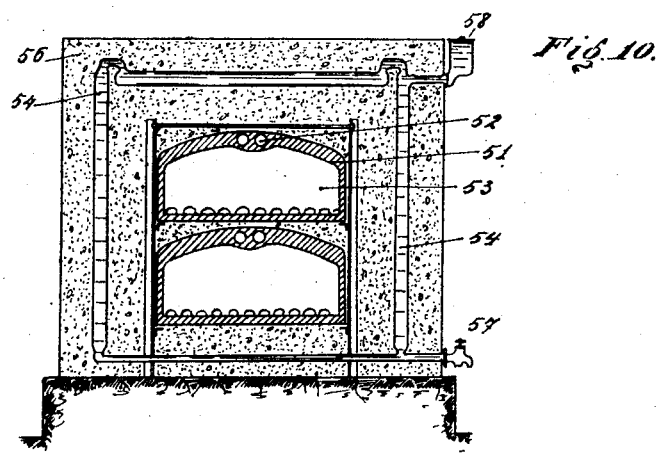
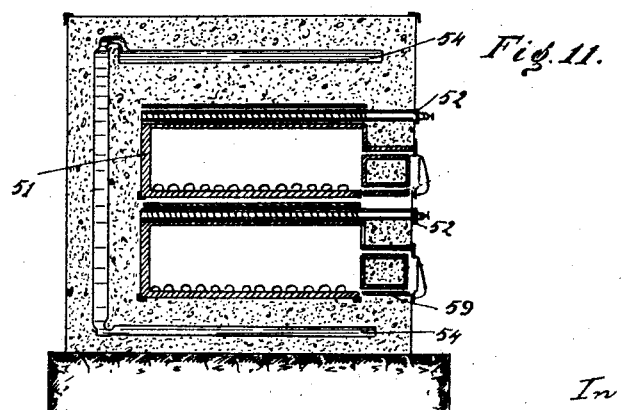

Dec. 25, 1923.  
S. SACERDOTE ET AL  
1,478,919  
THERMOELECTRIC HEAT ACCUMULATING COOKING STOVE  
Filed March 24, 1921   5 Sheets-Sheet 4
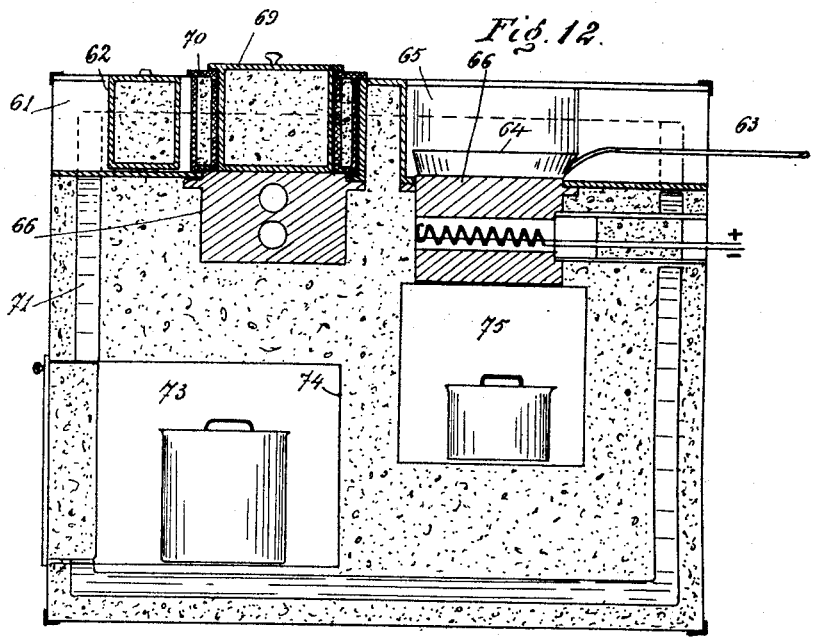
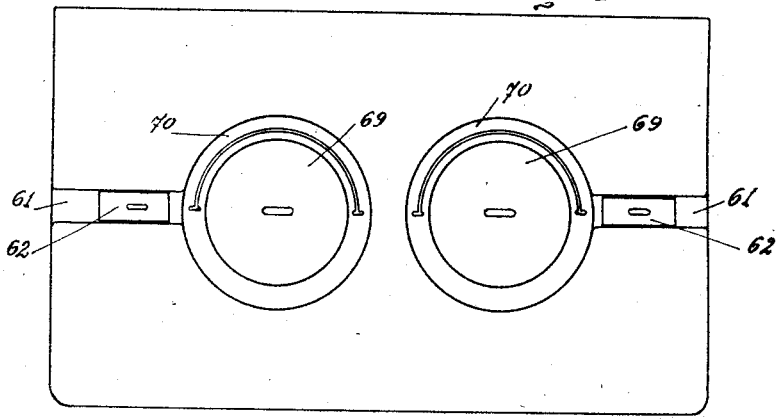
Inventors:
Secondo Sacerdote
and Severino Cristiani Patented Dec. 25, 1923.

1,478,919

UNITED STATES PATENT OFFICE.

SECONDO SACERDOTE AND SEVERINO CRISTIANI, OF MILAN, ITALY.

THERMOELECTRIC HEAT-ACCUMULATING COOKING STOVE.

Application filed March 24, 1921. Serial No. 455,016.

*To all whom it may concern:*

Be it known that we, SECONDO SACERDOTE and SEVERINO CRISTIANI, subjects of the King of Italy, residents of Milan, Kingdom of Italy, have invented certain new and useful Improvements in Thermoelectric Heat-Accumulating Cooking Stoves, of which the following is a specification.

The present invention has for its object cooking stoves in which heat derived from the transformation of electrical energy is conveyed to the stoves in a continuous or almost continuous manner, the heat being collected in a heat accumulator which is capable of restoring it at any required moment, at the necessary temperature and with desired rapidity.

The object of the present invention is to provide a cooking stove of the type indicated characterized by simplicity of construction, economical working, and by the fact that maintenance expenses are practically negligible.

The accompanying drawings show by way of example several forms of apparatus according to the invention which embody the essential structural characteristics necessary to ensure a high efficiency.

In said drawings, Figures 1 and 2 are vertical and horizontal sections, respectively, of one form of cooking stove.

Fig. 3 is a vertical sectional view of a heater which may be used as a cover for the construction shown in Figs. 1 and 2, or by itself as a separate entity.

Fig. 4 is a vertical sectional view of the heating device of Fig. 3 used by itself.

Fig. 5 is a horizontal section of Fig. 3.

Fig. 6 is an enlarged detail sectional view of a modified form of insulating core and electric resistance.

Figs. 7 and 8 are vertical and horizontal sections, respectively, of a modified form of stove comprising a water chamber functioning as a temperature stabilizer.

Fig. 9 is a plan view of a modification or development of the type of stove shown in Figs. 7 and 8.

Figs. 10 and 11 are vertical sectional views, taken at right angles to each other, of a bread oven constructed in accordance with the invention.

Figs. 12 and 13 are vertical sections taken at right angles to each other, and Fig. 14 is a plan view, of a further modified form of stove.

Figure 13:
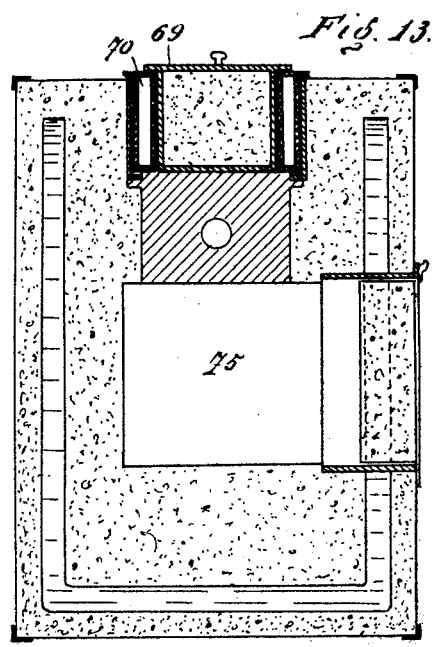

Referring to Figs. 1 and 2, 1 indicates a metallic body of suitable dimensions and provided with one or more holes 2, into which are introduced the cores 3, consisting of a material which is a good insulator of electricity. Around each of these cores is coiled an electrical resistance 27 which becomes heated when an electric current is passed through it, the current being supplied by line wires leading from a suitable source of supply to the binding posts 26, which latter are covered by a closure 25.

The heat generated by the current is absorbed by the metallic body 1, which attains an increased temperature, said body being completely surrounded by a heat insulating substance, whereby the dispersion of the heat is prevented. The rise in temperature and amount of heat accumulated in the body 1 depend entirely upon the efficiency of the heat insulating material employed. By suitably varying the intensity of the electric current, the volume of the heat absorbing mass and the thickness of the protecting cover, the temperature and the number of calories or heat units available for the cooking operations may be regulated at will.

The body 1 may be of cylindrical form, its lower side being supported on a tube 8 of heat insulating material composed of a mixture of cement and asbestos or other similar substance, said tube resting, in turn, upon the bottom wall of the exterior casing 12 of the stove. The edge of the upper face of body 1 is provided with a rebate on which is fitted a tube 4 also composed of heat insulating material (for example cement and asbestos). A packing of asbestos (or the like) 6 forms a rigid sealed joint between the tube 4 and the body 1.

The tube 4 extends to the upper part of the stove and is provided with a border 11 of angular section around its upper annular edge.

The whole of the space contained within the exterior casing 12 must be filled with a good heat insulating material 7, with the exception of the interior of the tube 4 which forms the cooking space to receive the cooking receptacle 10 (shown in dotted lines) which must rest directly upon the heating body 1 so that the heat of the latter will be transmitted directly to the receptacle,—thus avoiding almost all loss of heat. When the receptacle 10 is removed from the cooking space, a block 9 of heat insulating material is placed in the space so that the heat shall not be dissipated. Said block may consist as shown in the drawing of a tube 5 similar to the tube 4, closed by two end plates of a material similar to that of the tube and filled within by a good heat insulating substance. To improve its appearance, the upper part of the block may be covered by a metal plate. The said block may with advantage be composed of removable concentric elements of decreasing diameters, so that only that part of the block need be removed from the cell which corresponds to the size of the saucepan or other receptacle which is to be used.

The working of the electric stove described is assisted by the use of the accessories shown in the Figs. 3, 4, 5. Referring thereto, 14 indicates a separate resistance element which uses the current supplied by the conductor 18. The turns of the resistance element 14 are arranged in the form of the rays of a star around a circular crown composed of insulating material and fixed by means of two insulating shields to a bolt which, in turn, is fastened in a plate 16 of insulating material. Another plate 13 of metal is attached to the edges of the plate 16 and forms therewith a chamber enclosing the resistance 14. A casing 17 filled with heat insulating material 19 encloses the whole in such a manner that the heat generated in the resistance can only be transmitted by way of the outer metallic surface of the radiating plate 13, which projects below the bottom wall 15 of the casing and is of such size and shape as to exactly fit in the cooking space in the stove, so that the said space may be heated both from below by the body 1 and from above by the said cover and is thus made suitable for use as an oven. The said cover can also be used as a simple electric stove, in which case it is inverted so as to dispose the radiator plate upwards. Furthermore, to retain the heat given off by radiation from the cooking receptacle 23, the latter may be inclosed in a casing comprising a tubular body 20 and a cover 21 therefor. This cover is removable bodily from the body part 20, but a hinged cover 24 (Fig. 7) may be employed, if preferred. The removable cover 21 may also be replaced by a heating cover such as shown in Fig. 3, in which the resultant structure will be in the nature of an oven.

Fig. 6 shows in section an insulating core 3 which carries the coils in a spiral groove formed in said core and the diameter of which corresponds to the hole formed in the body 1, the arrangements being such that the coils remain completely insulated both from themselves and from the walls of said hole. The said core 3 is of sufficient length to fill the hole 2 formed in the body 1 and to reach completely across the width of the heat insulating material 7, an arrangement which possesses the advantage that it is possible to place the stoves in circuit from the exterior, and further, the replacing and substitution of parts without dismantling the stove is also made possible. By variably connecting the terminals of one or several resistance elements, the heating action may be correspondingly modified.

In Figs. 7 and 8 is shown in vertical and horizontal section an electric stove of the above described type, but provided with a water container 32 arranged within the heat insulating mass 7 and serving as a temperature stabilizer. The tap 33 serves for the withdrawal of the water, which is introduced into the stabilizer from the supply tank 34. The body of this stove also comprises a chamber 35, the walls of which are formed of heat-insulating material, said chamber being surrounded by material 37 which is a poor conductor of heat, and provided with a removable cover 21; this chamber can be used as a cooking chamber, in which case saucepans or other receptacles 36 are introduced which have already been heated to the boiling point.

Fig. 9 shows a stove such as represented in Fig. 7 provided with two large and one small cooking cells 42 and 43 heated by a single heat accumulating mass, two heat insulated cells 44 and a water chamber 46 supplied from a reservoir 47.

Figs. 10 and 11 show two vertical sections of an electric bread baking oven, constructed in all its essentials as the above mentioned stoves, comprising two baking chambers 53 arranged one above the other and into which the bread is inserted, each chamber being formed in a heat accumulating body 51. The bread is baked by means of the heat generated in the electric resistances 52 consisting of interchangeable elements contained within the holes formed in the arch of each chamber 53.

The heat accumulating bodies 51 of the ovens are as in the above described stoves, surrounded with heat retaining material 56 and provided with a water chamber 54 which serves as a temperature stabilizer, said water chamber being supplied from a reservoir 58 and provided with a discharge cock 57.

The arrangements already described have for their object to assist the operation and to increase the heating capacity.

The modifications now to be described have for their object to permit the provision in the stoves of cooking spaces adapted for various ranges of temperature, and the employment of cooking receptacles provided with long handles and also receptacles of oblong shape; and further to improve the working and usefulness of the heat insulating spaces by using the heat which has a tendency to be dissipated.

Figure 15:
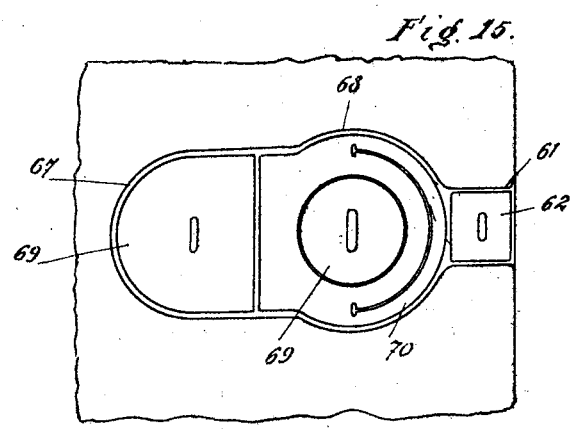
Fig. 15 is a development of said form constructed to enable the use of oblong cooking utensils provided with long handles.

Figs. 12 to 14 show a modified form of cooking stove, provided with cooking spaces and which permits the insertion and removal of long handled cooking receptacles and of heat insulating cells capable of being transformed into warm cells or hot cells employable as ovens; and Fig. 15 shows a plan view of a double stove for oblong receptacles provided with handles.

The adoption of different heat accumulating blocks as they are shown in the accompanying drawing permits the heating conditions of the different cells to be entirely independent of one another. Furthermore by selecting the various blocks as required with regard to their size and the area of contact surface, chambers adapted to supply widely varying needs can be obtained; for example, cells in which a large number of calories may be employed at a comparatively moderate temperature (necessary for cookery requiring a slow fire) and cells in which are employed a small number of calories at a high temperature (necessary for cookery requiring a quick fire).

As shown in the drawing, to allow the handles to project from the stove there is formed a vertical slit 61 in the heat insulating wall which may be closed by a rectangular plug 62 and so arranged that the handle 63 of a receptacle 64 placed in the cooking chamber 65 in contact with the heat accumulating block 66 may project therethrough.

The arrangement of two cooking chambers 67 and 68 in communication with one another, and heated by a single block with two plates, or by two separate adjoining blocks arranged as shown in Fig. 4, permits, when the two plugs stopping the chambers 67 and 68 are removed, the introduction therein of an oblong saucepan or other receptacle.

The plugs for closing the cells may also be composed of two pieces, a central portion 69 and exterior annular portion 70, in order to provide a cell of limited dimensions for small receptacles, by removing the central cover or a large cell for larger sized receptacles by removing both covers.

In order that the heat insulating cells 73 may be luke warm or heated instead of cold they are arranged in the heat insulating mass at determined distances from the accumulating blocks 66 and in such a manner that they shall be surrounded by the water chamber 71, serving as a temperature stabilizer.

By the arrangement of a cell 75 close to an accumulating block as shown in the drawing, it may be heated in such a manner as to be employed as an oven.

The luke warm and hot cells which in the drawing are arranged under the cooking chambers, and open through the lateral walls of the stove, may be placed at the same level as the cooking chambers so that access may be had to them through the top plate of the stove.

Having now particularly described and ascertained the nature of our said invention, and in what manner the same is to be performed, we declare that what we claim is:

1. A stove, comprising a heating body of high thermal capacity having one or more holes extending completely therethrough; an electric heating element inserted into each hole and projecting beyond the same at one end; a casing of heat-insulating material enclosing said heating body and formed with a hole in register with each first-named hole and through and beyond which the projecting end of the respective heating element extends; current-supply means variably connectible exteriorly of said casing to the projecting terminals of the heating element or elements to regulate the heat developed thereby; and one or more cooking chambers heated by the heating body.

2. A stove, comprising a heating body of high thermal capacity having a plurality of holes extending completely therethrough; a core of non-conducting material removably inserted into each hole and projecting beyond the same at one end, each core having an electric resistance applied to it; a casing of heat-insulating material enclosing said heating body and formed with a hole in register with each first-named hole and through and beyond which the projecting end of each core extends with its resistance; current-supply means connected to the projecting terminals of the resistances exteriorly of the casing; and one or more cooking chambers heated by the heating body.

3. A stove, comprising a heating body of high thermal capacity having one or more holes formed therein; an electric heating element inserted into each hole; current-supply means connected to the electric heating elements; a solid casing of heat-insulating material enclosing the heating body and having formed in its interior, in spaced relation to its outer surface and to that of the heating body, a temperature-stabilizing water chamber which surrounds said heating body; and one or more cooking chambers heated by the heating body.

4. A stove, according to claim 3, in which the water chamber formed in the interior of the insulating material constituting the casing opens through said casing to provide an inlet and an outlet for the water; the inlet communicating directly with a reservoir which is connected to and carried by the casing, and the outlet being provided with a drain valve.

5. A stove, comprising a heating body of high thermal capacity; means for electrically heating the same; a casing of heat-insulating material enclosing the heating body and recessed to form a plurality of cooking chambers heated by said body, at least one of said chambers opening at its top through said casing and at its bottom directly upon said body to permit a cooking utensil to be inserted into said chamber and supported upon said body, said chamber having a continuation which opens laterally through one side wall of the casing to permit the extension therethrough of the handle of the utensil; and plugs for closing the open top of said chamber and its continuation when the utensil is not in use.

6. A stove, comprising a heating body of high thermal capacity; means for electrically heating the same; a casing of heat-insulating material enclosing the heating body and recessed to form a plurality of cooking chambers heated by said body, at least one of said chambers opening at its top through said casing and at its bottom directly upon said body to permit a cooking utensil to be inserted into said chamber and supported upon said body, and another of said chambers opening at its top directly against the bottom of said body and at one side through the adjacent side wall of the casing; a removable plug closing the open top of the first chamber; and a door for closing the open side of the second chamber.

In testimony whereof we affix our signatures.

SECONDO SACERDOTE.
SEVERINO CRISTIANI.